Patented Apr. 29, 1941

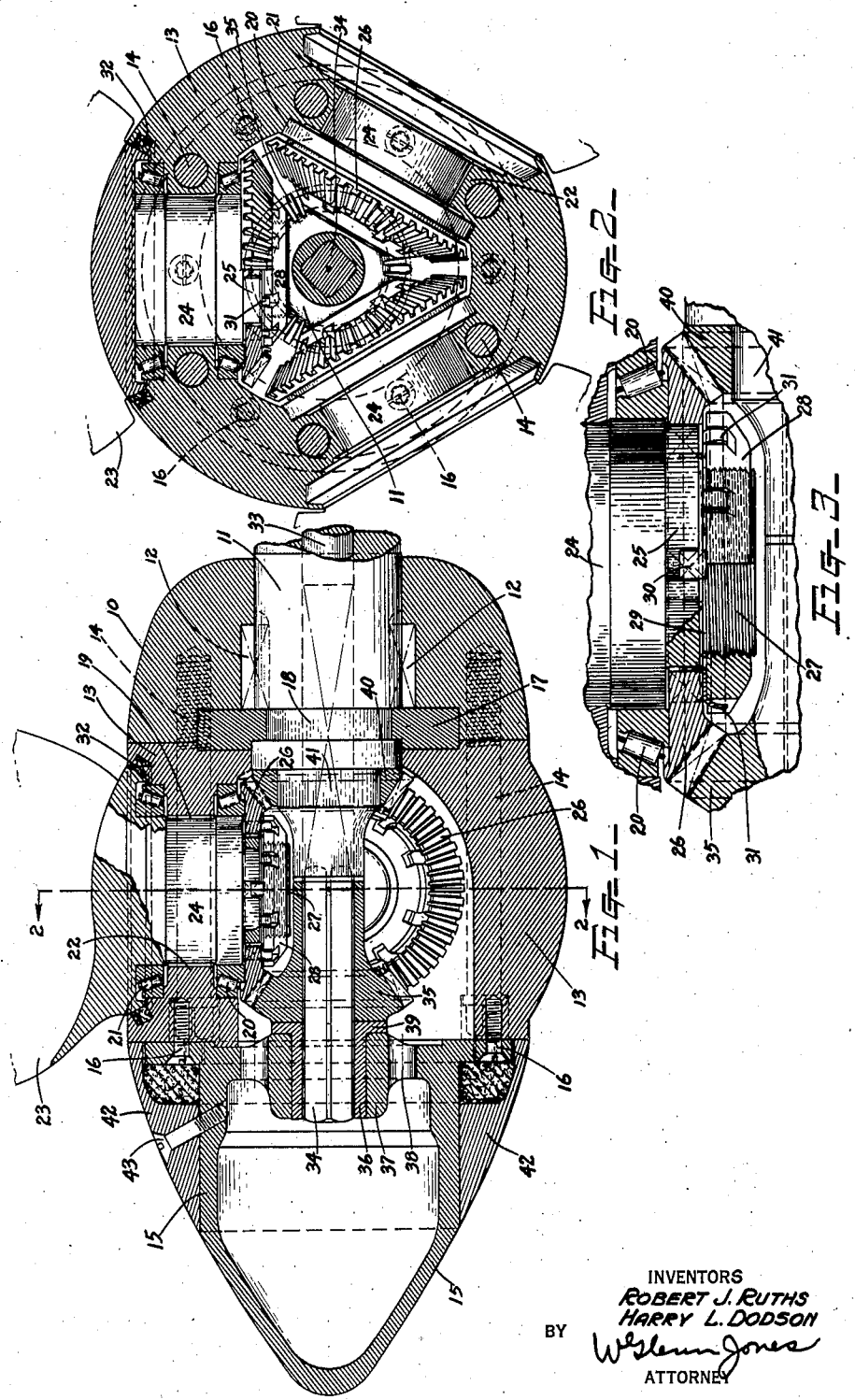

2,239,739

UNITED STATES PATENT OFFICE 2,239,739

VARIABLE PITCH PROPELLER

Robert J. Ruths, Baltimore, Md., and Harry L. Dodson, United States Navy

Application January 3, 1940, Serial No. 312,224

2 Claims. (Cl. 170—163)

(Granted under the act of March 3, 1883, as amended April 30, 1928; 370 O. G. 757)

This invention relates to variable pitch propellers of the pusher or puller type and it has for its principal object the provision of a propeller of the type indicated in which the pitch of the blades may be altered to any desired angle and in which the blades may continuously rotate about radially extending axes, thus avoiding the danger of injuring the pitch changing gears as is the case when limiting stops are employed and the mechanism is inadvertently permitted to overrun.

Another object of the invention is to provide a propeller of the character described which is very compact and rugged in construction and which is very positive and accurate in operation.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical use, without limiting the improvements in their useful application to the particular construction, which, for the purpose of explanation, have been made the subject of illustration.

In the accompanying drawing:

Fig. 1 is a longitudinal sectional view through a propeller hub embodying the invention;

Fig. 2 is a transverse sectional view taken on line 2—2 of Fig. 1; and

Fig. 3 is an enlarged fragmentary view partly in elevation and partly in section of the means for anchoring the propeller blades in the hub.

Referring to the drawing, the improved propeller hub is shown as comprising a forward portion 10 which is fixed to a tubular main drive shaft 11 by keys 12, a unitary intermediate portion 13 which is secured to the forward portion 10 by longitudinally extending bolts 14 and a hollow after or hub cap portion 15 of streamline configuration which is secured to the intermediate portion 13 by screws 16. This hub structure is maintained against axial displacement by means of a split collar 17 engageable with a circumferential groove or channel 18 formed in the main drive shaft and clamped between the forward and intermediate portions 10 and 13 of the hub.

The intermediate portion 13 of the hub is provided with a plurality of radially extending bores 19 formed with inner and outer seats for bearings 20 and 21 respectively and an intermediate annular shoulder 22. The propeller includes a plurality of blades 23, each having a root portion 24 journalled in the bearings 20 and 21 and formed with a reduced end 25 on which a bevel gear 26 is splined and an inner threaded stud 27 onto which a nut 28 is screwed for abutting engagement with the bevel gear 26 to prevent the displacement of the latter. A malleable lock washer 29 (Fig. 3) is interposed between the bevel gear 26 and the nut 28 and is provided with a series of inner and outer circumferential tongues 30 and 31 adapted to enter spline recesses formed in the reduced portion 25 of the root and in corresponding recesses in the periphery of the nut so as to prevent the unscrewing of the nut.

In assembling this portion of the apparatus, the outer bearing 21 is first slipped onto the root portion 24 and the root inserted in the bore 19. The inner bearing 20 is then inserted through the open rear end of the hub before it is closed by the hub cap 15 and slipped over the root and placed in its seat. The bevel gear 26 is next mounted on the reduced portion 25 of the root and the lock washer 29 with alternate tongues 30 bent outwardly at right angles to the plane of the washer is positioned with the tongues 30 inserted in their recesses in the reduced end 25. The nut is then screwed up until the bevel gear 26, being forced against the inner bearing 20, draws the parts together the desired amount. The unbent tongues 31 are then bent inwardly into the recesses in the nut. A packing washer 32 of any preferred type is interposed between the blade 23 and the hub to prevent the escape of lubricant or the infiltration of water.

The blades 23 may be rotated any desired amount in the hub in order to vary their pitch by means of a quill or control shaft 33 which extends coaxially through the drive shaft 11 and is rotatable therein. This shaft is provided with a squared extremity 34 on which a bevel pinion 35 is slidably but nonrotatably mounted for intermeshing engagement with each of the bevel gears 26. A cylindrical bushing 36 is mounted on the extreme rear end of the squared end 34 of the shaft 33 and is mounted in a support 37 carried by a spider 38 formed integrally with the hub cap portion 15. The squared end of the shaft 33 rotates in the bushing 36, the latter, together with the support 37, merely functioning as a steadying means for the rear end of the shaft 33. The bushing 36 is also formed with a flange 39 at its forward end for abutting engagement with the bevel pinion 35, the construction being such that the face of the flange 39 may be dressed down or the space between the flange and the pinion shimmed up by adapters so that when the hub cap 15 is secured in position the pinion 35 will be held in accurate intermeshing engagement with bevel gears 26 without lost motion or play.

Although the bevel pinion 35 meshes with each of the bevel gears 26 so as to cause the propeller blades 23 to turn in unison when the pitch thereof is altered, additional means is provided to prevent binding of the parts which may be caused by infiltrations of foreign matter such as sand and the like. This consists of an idler bevel pinion 40 which is rotatably mounted on a reduced portion 41 of the main drive shaft 11 for intermeshing engagement with each of the bevel gears 26 at points diametrically disposed from the bevel pinion 35.

The hollow hub cap 15 is filled with a supply of lubricant which passes through the spider 38 to the moving parts of the propeller. Inward or outward leakage between the hub cap and the portion 13 of the hub is prevented by a packing ring 42 which is secured to the hub cap by screws 43.

It will be understood that the above description and accompanying drawing comprehend only the general and preferred embodiment of the invention and that various changes in construction, proportion and arrangement of the parts may be made within the scope of the appended claims without sacrificing any of the advantages of the invention.

The invention described herein may be manufactured and/or used by or for the Government of the United States of America for governmental purposes without the payment of any royalties thereon or therefor.

We claim:

1. A variable pitch propeller comprising a main drive shaft; a hub carried by said shaft, said hub embodying a forward portion keyed to said drive shaft, a unitary intermediate portion fixed to said forward portion and an after streamlined cap portion fixed to said intermediate portion; and said drive shaft having a circumferential groove therein; a multipart thrust collar engageable with said groove and clamped between the forward and intermediate portions of said hub for preventing axial movement of said hub; a plurality of blades having root portions mounted in the intermediate portion of said hub for free rotation about radially extending axes completely throughout 360° in opposite directions to vary the pitch thereof; a bevel gear fixed to the inner end of each of said root portions; a quill shaft extending through and rotatable in said drive shaft and having its after end rotatably and slidably journalled in the after cap portion of said hub; a bevel pinion slidably keyed to the after end of said quill shaft and meshing with each of said bevel gears; and a second bevel pinion rotatably mounted on said drive shaft for engagement with said bevel gears and diametrically opposed to said first mentioned bevel gear to uniformly transmit power from one of said bevel gears to another.

2. A variable pitch propeller comprising a main drive shaft; a hub carried by said shaft, said hub embodying a forward portion keyed to said drive shaft, a unitary hollow intermediate portion fixed to said forward portion and an after hollow streamlined cap portion fixed to said intermediate portion and communicating with said intermediate portion for containing a supply of lubricant for the moving parts of said propeller; and said drive shaft having a circumferential groove therein; a multipart thrust collar engageable with said groove and clamped between the forward and intermediate portions of said hub for preventing axial movement of said hub; a plurality of blades having root portions mounted in the intermediate portion of said hub for free rotation about radially extending axes completely throughout 360° in opposite directions to vary the pitch thereof; a bevel gear fixed to the inner end of each of said root portions; a spider carried by said cap portion; a support carried by said spider; a quill shaft extending through and rotatable in said drive shaft and having its after end rotatably and slidably journalled in said support; a bevel pinion slidably keyed to the after end of said quill shaft forward of said support and meshing with each of said bevel gears; and a second bevel pinion rotatably mounted on said drive shaft for engagement with said bevel gears and diametrically opposed to said first mentioned bevel gear to uniformly transmit power from one of said bevel gears to another.

ROBERT J. RUTHS.
HARRY L. DODSON.